United States Patent [19]
Chu et al.

[11] Patent Number: 5,879,764
[45] Date of Patent: Mar. 9, 1999

[54] DESICCATION USING POLYMER-BOUND DESICCANT BEADS

[75] Inventors: Jia-Ni Chu, Wilmington, Del.; James Neil Pryor, West Friendship; William Alan Welsh, Highland, both of Md.

[73] Assignee: W. R. Grace & Co.-Conn., New York, N.Y.

[21] Appl. No.: 746,043

[22] Filed: Nov. 6, 1996

[51] Int. Cl.⁶ .............................. E06B 3/24; C03C 27/00
[52] U.S. Cl. ........................... 428/34; 52/172; 52/786.1; 52/786.13; 156/109
[58] Field of Search .................. 428/34, 402; 52/786.13, 52/172, 786.1; 156/109, 107

[56] References Cited

U.S. PATENT DOCUMENTS

| | | | |
|---|---|---|---|
| 2,882,243 | 4/1959 | Milton | 252/455 |
| 2,882,244 | 4/1959 | Milton | 252/455 |
| 3,687,297 | 8/1972 | Kuhn et al. | 710/502 |
| 3,758,996 | 9/1973 | Bowser | 52/172 |
| 4,250,081 | 2/1981 | Bode et al. | 260/42 |
| 4,295,994 | 10/1981 | Kulprathipanj | 252/430 |
| 4,337,171 | 6/1982 | Kulprathipanja | 252/430 |
| 4,371,510 | 2/1983 | Christophliem | 423/329 |
| 4,414,111 | 11/1983 | Iwaisako et al. | 210/500.2 |
| 4,526,877 | 7/1985 | Acharya et al. | 502/60 |
| 4,529,541 | 7/1985 | Wilms et al. | 252/526 |
| 4,576,986 | 3/1986 | Kostinko | 524/450 |
| 4,590,233 | 5/1986 | Erwied et al. | 524/357 |
| 4,604,372 | 8/1986 | Morishita et al. | 502/62 |
| 4,612,342 | 9/1986 | Kostinko | 524/450 |
| 4,807,419 | 2/1989 | Hodek et al. | 52/788 |
| 4,822,492 | 4/1989 | Chao et al. | 210/679 |
| 4,888,378 | 12/1989 | Kostinko | 524/450 |
| 4,920,090 | 4/1990 | Ritter et al. | 502/439 |
| 4,925,459 | 5/1990 | Rojey et al. | 155/16 |
| 5,025,752 | 6/1991 | Yananton | 119/169 |
| 5,120,600 | 6/1992 | Suppiah | 428/323 |
| 5,143,708 | 9/1992 | Nakazawa et al. | 423/328 |
| 5,177,916 | 1/1993 | Misera et al. | 52/172 |
| 5,350,785 | 9/1994 | Sander et al. | 524/100 |
| 5,413,975 | 5/1995 | Mueller et al. | 502/60 |
| 5,534,186 | 7/1996 | Walter et al. | 252/194 |

FOREIGN PATENT DOCUMENTS

| | | |
|---|---|---|
| 0068816 | 1/1983 | European Pat. Off. . |
| 2394728 | 6/1977 | France . |
| 2379691 | 1/1978 | France . |
| 4109037 | 9/1992 | Germany . |
| 6443346 | 2/1989 | Japan . |
| 1308762 | 1/1971 | United Kingdom . |
| 2126123 | 8/1983 | United Kingdom . |
| 9416801 | 1/1994 | WIPO . |

*Primary Examiner*—Donald Loney
*Attorney, Agent, or Firm*—Charles A. Cross

[57] ABSTRACT

Polymer-bound adsorbent beads are usable as a direct replacement for conventional clay-bound beads in insulating glass unit manufacture to eliminate the problem of dusting associated with conventional beads. Polymer-bound beads provide good adsorption and superior crush strength compared to clay-bound adsorbent beads previously used in insulating glass units to desiccate the space between the glass panes. The polymer-bound adsorbent beads may also be used as a substitute for conventional desiccant beads in water adsorption applications such as in bottle stoppers, sachets, blister packaging, etc.

25 Claims, No Drawings

DESICCATION USING POLYMER-BOUND DESICCANT BEADS

BACKGROUND OF THE INVENTION

Multiple pane insulating glass (IG) units or windows have been in use for many years. Over this time, many variations in window design have been made. Most designs involve two or more panes of glass which are held in a spaced relationship by a spacer which is located between the panes at their edges. The spacer and panes are typically fixed together by a sealant or other means. The spacer and panes thereby define a closed interior space in the insulating glass unit which is largely responsible for the insulating benefit associated with the unit.

Typically, when the IG unit is sealed, some water vapor remains in the resulting closed interior space. If no measures are taken, this water vapor would condense on the panes when the unit is exposed to typical service temperatures thereby causing fogging. A similar effect may occur if materials used to construct the IG unit contain volatile organic compounds which can pass to the interior space of the unit. To prevent fogging, most IG unit designs provide a means for adsorbing water vapor/chemical volatiles in the interior space over the expected life of the IG unit.

In conventional designs, one or more compartments are located at the periphery of the interior space either in the spacer itself or adjacent to the spacer. The compartment(s) is adapted to contain adsorbent materials (typically desiccants) in bead form in a manner such that the adsorbent beads communicate with the interior space to provide an adsorbing function for that space while the beads are retained in and by the compartment(s). Thus, fogging is prevented.

The beads used for this type of application generally consist of one or more types of molecular sieve bound by an inorganic binder (typically clay). The beads are designed to be free-flowing. Thus, they can easily be poured into the compartment to provide the desired quantity of desiccant.

While this basic IG technology has been for many years, the conventional clay-bound adsorbent beads present handling problems especially for the window manufacturer. Specifically, clay-bound adsorbent beads generally cause a large amount of dust. This dust is caused in part by the fact that clays are powdery materials by nature and also because the beads are susceptible to brittle crushing during handling which causes disintegration of the beads into dust.

The dust problem has been considered to be largely inescapable. The desire to avoid the problem has led to alternative designs which avoid the use of beaded desiccants use of desiccated adhesive resins which are adhered directly to the specially designed spacers and/or by use of special spacer constructions whereby the spacer is formed in part by a desiccated resin. These alternatives are expensive both from the point of raw materials cost and from the point of capital cost associated with the purchase of equipment needed to implement the alternatives.

Thus, there is a need for a solution to the dusting problem which still allows window manufacturers to use conventional IG unit designs and manufacturing equipment while avoiding the dust problem associated with conventional clay-bound beads.

There are similar needs for improved adsorbent beads to replace conventional inorganic-bound adsorbent beads in other applications.

SUMMARY OF THE INVENTION

The invention provides a solution to the above problem by providing polymer-bound adsorbent beads which are usable as a direct replacement for conventional clay-bound beads in insulating glass unit manufacture.

In one aspect, the invention encompasses an insulating unit comprising at least two panes of glass which are fixed in a spaced relationship, at least one spacer member located between the panes about the edges of the panes, the panes and the spacer member(s) defining at least one closed interior space in the unit, and at least one compartment located at the periphery of the interior space(s), the compartment(s) being adapted to contain adsorbent beads such that the adsorbent beads communicate with the interior space(s) to provide an adsorbing function for the interior space(s) while the beads are retained in and by the compartment(s), wherein the compartment(s) contains adsorbent beads and at least a portion of the adsorbent beads are polymer-bound adsorbent beads.

In another aspect, the invention comprises an improvement in the method of manufacture of such insulating glass units wherein the method comprises filling least one compartment with adsorbent beads, the compartment(s) to be located at the periphery of an interior space in the unit defined in part by at least two panes of glass in the unit, the compartment(s) being adapted to contain adsorbent beads such that the adsorbent beads communicate with the interior space to provide an adsorbing function for the interior space while the beads are retained in and by the compartment(s), and the improvement comprising filling the compartment(s) with adsorbent beads wherein at least a portion of the adsorbent beads are polymer-bound adsorbent beads.

The polymer in the polymer-bound beads is preferably a thermoplastic resin or a wax or a combination thereof.

The invention also encompasses the use of polymer-bound adsorbent beads as a substitute for conventional desiccant beads in water adsorption applications such as in bottle stoppers, sachets, blister packaging, etc.

These and other aspects of the invention are described in detail below.

DETAILED DESCRIPTION OF THE INVENTION

The invention encompasses providing polymer-bound adsorbent beads which are usable as a direct replacement for conventional clay-bound beads in insulating glass unit manufacture. The invention thus encompasses improved insulating glass units containing such polymer-bound adsorbent beads as well as improvements to methods for manufacturing insulating glass units which involve the use of polymer-bound adsorbent beads.

The basic components of the polymer-bound beads of the invention are a polymer binder component and an adsorbent component which is bound by the polymer binder.

The polymer binder component may contain any of a variety of organic polymers or combination of polymers. Preferably, the polymer binder component comprises thermoplastic polymer(s). The polymer binder component preferably comprises a thermoplastic resin or wax or combination thereof. While the invention is not necessarily limited to any specific polymer binder compositions, polyolefin resins and/or waxes are preferred.

Preferred thermoplastic resins preferably have a melt flow index of at least about 5, more preferably about 7–100 (ASTM D 1238–89 measured at 190° C./2.16 kg or comparable conditions as specified). In some instances, a thermoplastic resin having melt flow index of less than 0.5 may be used at lower zeolite loadings (e.g. 10 to 30 wt. %) or in combination with waxes or higher melt flow index resins. Alternatively, preferred thermoplastic resins have a weight average molecular weight of about $1\times10^4$ to $1\times10^8$, more preferably about $5\times10^4$ to $1\times10^7$, most preferably about $7.5\times10^4$ to $2\times10^6$. Waxes typically have weight average molecular weights on the order of 1000 to 10000. Preferred waxes have a weight average molecular weight of at least about 2000, more preferably about 3000–5000. Preferably, the polymer or combination of polymers is selected such that the mixture formed in combination with the adsorbent component can be flowed or extruded at a reasonable temperature (e.g. 50°–450° C., more preferably 80°–300° C.) to form the desired beads.

The adsorbent component preferably includes conventional water-adsorbing (desiccating) inorganic adsorbent such as zeolites, silica gels, activated carbons, non-zeolite molecular sieves, etc. Zeolite desiccants are generally preferred. Zeolite A, especially zeolite 3A is a most preferred water-adsorbing material. If-desired, adsorbents designed to adsorb low molecular weight organic compounds (e.g. zeolite 13X) may be blended with the water-adsorbing material.

The polymer-bound adsorbents of the invention preferably contain at least about 10 wt. % of the adsorbent component, more preferably about 30–80 wt. %, most preferably about 40–75 wt. %. In some instances, minor amounts of additional components may be included in the polymer-bound adsorbents of the invention. For example, coloring agents, antistatic agents, scents, lubricants, antioxidants, etc. may be included.

The beads of the invention can be made in a variety of sizes. Preferably, the beads have a maximum dimension (particle size) of at least about 0.1 mm, more preferably at least about 0.5 mm. The upper limit on the bead dimension is preferably about 15 mm. Beads which are useful for conventional desiccation applications with typically have a size of about 0.5–5 mm, more preferably 0.5–3 mm. The beads preferably have an aspect ratio of about 2 or less, more preferably about 1.5 or less, most preferably about 1 to 1.2. The particle size is preferably measured using an optical image analyzer (e.g. LECO 2001 Image Analyzer from Leco Corp., Lakeview, Mich.), however other appropriate size measurement techniques may also be used. The proper use of image analyzer techniques for particle size measurement is well known those skilled in the art.

The beads preferably have a compacted bulk density of about 0.6 g/ml, more preferably about 0.65–0.80 g/ml. The compacted bulk density refers to the density measured after the beads have been vibrated or tapped to a constant volume. The compacted bulk density should not be confused with a tamped bulk density wherein a compacting force is directly applied to the particles. The beads of the invention may be made in a very narrow size distribution. Where increased bulk density is desired, it is possible to use beads which have a broader size distribution or a multimodal (e.g. bimodal) particle size distribution.

The beads of the invention are generally very low dusting or dustless. Dusting is measured using a RM 61-03 smoke density monitor from SICK Optic Electronic, Eden Prarie, Minn. The measurement procedure involves placing a 100 ml sample of the beads into the bottom of a chamber and dislodging the dust from the sample using a fan. The light transmission through the air containing the dislodged dust is then measured to indicate the amount of dust generated. The dusting value is inversely proportional to the % of light transmission. A range of 100%–82.2% transmission is broken down into a 320 point scale with zero representing 100% transmission (i.e. a dustless material). The reported value is based on the average of 5 readings. The beads of the invention preferably have a dusting value of 30 or less, more preferably 10 or less, most preferably 0–5.

The polymer-bound adsorbents of the invention may be made with a variety of adsorption capacities and adsorption rates. In general, the adsorption capacity will increase with increasing adsorbent content in the beads. The adsorption rate generally increases with increasing adsorbent content and decreasing bead size. Preferably, the beads have a water adsorption capacity of at least about 3 wt. % measured at 50% relate room temperature, more preferably about 5–20 wt. %, most preferably about 6–15 wt. %.

The beads of the invention may be made by a variety of methods. Preferably, the beads are formed by a process wherein the polymer and absorbent are compounded while the polymer is in a molten state. The resulting mixture is then formed into beads. The bead manufacturing process is preferably characterized by the absence of solvent in the polymer-adsorbent mixture throughout the bead forming process.

The compounding is preferably performed using a mixer followed by an extruder (e.g. a single or twin screw extruder) or similar mixing device. The compounded mixture is then preferably formed into beads using device such as a centrifugal extruder or an underwater pelletizer. Such devices are commonly known in the art for formation of thermoplastic polymer pellets. These methods are generally characterized by passing of the molten mixture through an orifice and chopping or cutting the mixture as it is passed through the orifice. The size and shape of the resulting beads can be controlled by selection of the appropriate temperature, extrusion pressure, die orifice size, cutting speed, etc. as is well known in the art of plastic pellet formation. Preferably, the beads of the invention are formed using an underwater pelletizer such as those sold by Gala Industries, Inc. Examples of centrifugal extruders are disclosed in U.S. Pat. Nos. 3,358,323; 3,424,832; 3,483,281; 4,408,972 and 4,050,874. See also generally Modern Plastics Encyclopedia published by McGraw Hill. The use of these particle forming techniques enables the formation of precise particle sizes with tailored particle size distribution. Where the extruder/pelletizer design and operating parameters are adequately controlled, it is possible to produce very narrow particle size distributions.

The beads of the invention may be used in any system where conventional inorganic-bound adsorbent beads are used. The uses for conventional adsorbent beads generally involve confining the beads in a specific location and then contacting the confined beads with a fluid (gas or liquid) to be treated. In some uses, the fluid to be treated is actively circulated (e.g. via use of a pump or fan or heater) through the confined beads. In other instances, the fluid is largely static (e.g., the interior of a package or electronic device or insulated glass window) and the species (typically water) to be adsorbed migrates to the beads (e.g., by diffusion).

The use of conventional inorganic-bound desiccant beads in insulating glass units (windows) is illustrated by inter alia U.S. Pat. Nos. 4,141,186; 4,520,602; 4,453,855; 5,253,683; 5,439,716 and 5,493,821, the disclosures of which are incorporated herein by reference. Typically, the insulating glass unit comprises at least two panes of glass which are fixed in a spaced relationship, at least one spacer member located between the panes about the edges of the panes, the panes and the spacer member(s) defining at least one closed interior space in the unit, and at least one compartment located at the periphery of the interior space(s), the compartment(s) being adapted to contain adsorbent beads such that the adsorbent beads communicate with the interior space(s) to provide an adsorbing function for the interior space(s) while the beads are retained in and by the compartment(s). The polymer-bound adsorbent beads of the invention may be used as all or part of the adsorbent beads contained in the spacer. Preferably at least 50 wt. % of the adsorbent beads contained in the window are the polymer-bound adsorbent beads of the invention.

The use of conventional inorganic-bound desiccant beads in refrigerant drying for air conditioning/refrigeration is illustrated by inter alia U.S. Pat. Nos. 4,272,264; 4,436,623; 4,464,261; 4,619,673; 5,540,348; and 5,569,316, the disclosures of which are incorporated herein by reference. Typically, the conventional inorganic-bound desiccant beads are placed in a canister and the refrigerant is contacted with the conventional inorganic-bound desiccant beads in the canister. The polymer-bound adsorbent beads of the invention may be used as all or part of the adsorbent beads contained in the canister. Preferably at least 50 wt. % of the adsorbent beads contained in the canister are the polymer-bound adsorbent beads of the invention.

The use of conventional inorganic-bound desiccant beads in bottle caps or stoppers, in sachets and in canisters is illustrated by inter alia U.S. Pat. Nos. 3,722,188; 4,957,521; 5,390,475; and 4,093,105, the disclosures of which are incorporated herein by reference. In bottle stoppers or bottle caps, the inorganic-bound desiccant beads are typically placed in a compartment in the cap and are held in place by a porous barrier which allows the desiccant beads to communicate with the interior of the bottle. In sachets and canisters, the inorganic-bound desiccant beads are typically placed in the sachet or canister which is then closed to hold the beads in place. The sachet or canister have one or more porous areas which allow the desiccant beads to communicate with the space exterior to the sachet or canister where the sachet or canister is located (e.g. the interior of a package or an electronic device). The polymer-bound adsorbent beads of the invention may be used as all or part of the adsorbent beads contained in the sachet or canister. Preferably at least 50 wt. % of the adsorbent beads contained in the sachet or canister are the polymer-bound adsorbent beads of the invention.

The use of conventional inorganic-bound desiccant beads in blister packaging is illustrated by inter alia U.S. Pat. Nos. 3,211,503; 3,343,897 and 4,753,352, the disclosures of which are incorporated herein by reference. Typically, this use involves retaining one or more conventional inorganic-bound desiccant beads in a compartment of the package which communicates via a porous barrier or narrow passage with the compartment(s) of the package to be desiccated. The polymer-bound adsorbent beads of the invention may be used as all or part of the adsorbent beads contained in the desiccant compartment. Preferably at least 50 wt. % of the adsorbent beads contained in the desiccant compartment are the polymer-bound adsorbent beads of the invention.

The invention is further illustrated by the following examples. The invention is not limited to the specific details of the examples.

EXAMPLE 1

50 parts by weight polyethylene wax (Epolene® N-14 from Eastman Chemical) were combined with 45 parts by weight of 3A (Sylosiv® A3 from Grace Davison) zeolite particles and 5 parts by weight of zeolite 13X (Sylosiv® A10 from Grace Davison) at elevated temperature. The resulting mixture was then fed to a centrifugal extruder and the extruder was adjusted to yield beads having a particle size of about 0.5–1.0 mm.

EXAMPLE 2

50 parts by weight low density polyethylene resin (PE1017 from Chevron Chemical) having a melt index of 7 were combined with 45 parts by weight of 3A (Sylosiv® A3 from Grace Davison) zeolite particles and 5 parts by weight of zeolite 13X (Sylosiv® A10 from Grace Davison) in a twin screw co-rotating extruder. The resulting mixture was then fed to an underwater pelletizer which was adjusted to yield beads having a particle size of about 2–3 mm.

EXAMPLE 3

17.5 parts by weight low density polyethylene resin (PE1017 from Chevron Chemical) having a melt index of 7 and 17.5 parts by weight polyethylene wax (Epolene® N-14 from Eastman Chemical) were combined with 58.5 parts by weight of 3A (Sylosiv® A3 from Grace Davison) zeolite particles and 6.5 parts by weight of zeolite 13X (Sylosiv® A10 from Grace Davison) in a twin screw co-rotating extruder. The resulting mixture was then fed to an underwater pelletizer which was adjusted to yield beads having a particle size of about 2–3 mm.

The resulting beads had a water adsorption capacity of about 13 wt. % when exposed to 50% relative humidity at room temperature.

EXAMPLE 4

12.5 parts by weight low density polyethylene resin (PE1017 from Chevron Chemical) having a melt index of 7 and 12.5 parts by weight polyethylene wax (Epolene® N-14 from Eastman Chemical) were combined with 67.5 parts by weight of 3A (Sylosiv® A3 from Grace Davison) zeolite particles and 7.5 parts by weight of zeolite 13X (Sylosiv® A10 from Grace Davison) in a twin screw co-rotating extruder. The resulting mixture was then fed to an underwater pelletizer which was adjusted to yield beads having a particle size of about 2–3 mm.

The resulting beads had a water adsorption capacity of about 15 wt. % when exposed to 50% relative humidity at room temperature.

EXAMPLE 5

20.8 parts by weight polyethylene wax (Epolene® N-14 from Eastman Chemical) were combined with 64.4 parts by weight of 3A (Sylosiv® A3 from Grace Davison) zeolite particles to form an initial mixture. The resulting mixture was then combined with 14.8 parts by weight low density polyethylene resin (PE1017 from Chevron Chemical) having a melt index of 7 in a twin screw co-rotating extruder. The resulting mixture was then fed to an underwater pelletizer which was adjusted to yield beads having a particle size of about 2–3 mm.

The beads had a compacted bulk density of about 0.78 g/ml and water adsorption capacity in excess of 7.3 wt. % when exposed to 50% relative humidity at room temperature. The beads had a dusting value of 1.

EXAMPLE 6

Three portions of the beads produced in example 5 were used as a feed for another underwater pelletizer having a finer die orifice sizes. This resulted in three samples of beads having particle size 0.25–0.45 mm, 0.5–0.75 mm and 0.8–1.0 mm respectively. The beads respectively had water adsorption capacity of 6.96 wt. %, 8.09 wt. % and 8.33 wt. % when exposed to 50% relative humidity at room temperature. The beads respectively had compacted bulk density of about 0.70 g/ml, 0.68 g/ml and 0.68 g/ml. All three samples had a dusting value of zero.

EXAMPLE 7

24 parts by weight polyolefin resin (PE-2075 from Rexene Corp.) having a melt index of 70 were combined with 68 parts by weight of 3A (Sylosiv® A3 from Grace Davison) zeolite particles and 8 parts by weight of zeolite 13X (Sylosiv® A10 from Grace Davison) in a twin screw co-rotating extruder. The resulting mixture was then fed to an underwater pelletizer which was adjusted to yield beads having a particle size of about 2–3 mm. The resulting beads had a water adsorption capacity in excess of 13.6 wt. % when exposed to 50% relative humidity at room temperature.

What is claimed is:

1. An insulating unit comprising at least two panes of glass which are fixed in a spaced relationship, at least one spacer member located between said panes about the edges of said panes, said panes and said spacer member(s) defining at least one closed interior space in said unit, and at least one compartment located at the periphery of said interior space (s), said compartments(s) being adapted to contain adsorbent beads such that said adsorbent beads communicate with said interior space(s) to provide an adsorbing function for said interior space(s) while said beads are retained in and by said compartment(s), wherein said compartment(s) contains adsorbent beads and at least a portion of said adsorbent beads are polymer-bound adsorbent beads comprising adsorbent compounded with a polymer binder.

2. The insulating glass unit of claim 1 wherein all of said adsorbent beads are polymer-bound adsorbent beads.

3. The insulating glass unit of claim 1 wherein said polymer-bound adsorbent beads comprise a molecular sieve adsorbent selected from the group consisting of zeolite A, zeolite 3A, zeolite X, and mixtures thereof.

4. The insulating glass unit of claim 1 wherein said polymer-bound beads comprise a thermoplastic polymer resin binder.

5. The insulating glass unit of claim 1 wherein said polymer-bound beads comprise an olefin polymer binder.

6. The insulating glass unit of claim 4 wherein said polymer-bound beads comprise an olefin polymer binder.

7. The insulating glass unit of claim 5 wherein said olefin polymer is selected from the group consisting of olefin resins, olefin waxes and mixtures thereof.

8. The insulating glass unit of claim 7 wherein said olefin polymer comprises a resin having a melt index of at least about 5.

9. The insulating glass unit of claim 8 wherein said olefin polymer comprises a resin having a melt index of about 7 to 100.

10. The insulating glass unit of claim 7 wherein said olefin polymer comprises a wax having a weight average molecular weight of at least about 2000.

11. The insulating glass unit of claim 10 wherein said olefin polymer comprises a wax having a weight average molecular weight of about 3000–5000.

12. The insulating glass unit of claim 1 wherein said polymer-bound adsorbent beads contain at least about 10 wt. % molecular sieve adsorbent.

13. The insulating glass unit of claim 12 wherein said polymer-bound adsorbent beads contain about 30–80 wt. % molecular sieve adsorbent.

14. The insulating glass unit of claim 1 wherein said polymer-bound adsorbent beads have an average particle size of at least about 0.1 mm.

15. The insulating glass unit of claim 14 wherein said polymer-bound adsorbent beads have an average particle size of about 0.5–3.0 mm.

16. The insulating glass unit of claim 1 wherein said polymer-bound adsorbent beads have an aspect ratio of about 2 or less.

17. The insulating glass unit of claim 16 wherein said polymer-bound adsorbent beads have an aspect ratio of about 1.5 or less.

18. The insulating glass unit of claim 1 wherein said polymer-bound adsorbent beads have a water adsorption capacity of at least 3 wt. % at 50% relative humidity at room temperature.

19. The insulating glass unit of claim 18 wherein said polymer-bound adsorbent beads have a water adsorption capacity of about 5–20 wt. % at 50% relative humidity at room temperature.

20. The insulating glass unit of claim 1 wherein said polymer-bound adsorbent beads have a compacted bulk density of at least 0.6 g/ml.

21. In a method of forming an insulating glass unit wherein said method comprises filling at least one compartment with adsorbent beads, said compartment(s) to be located at the periphery of an interior space in said unit defined in part by at least two panes of glass in said unit, said compartment(s) being adapted to contain adsorbent beads such that said adsorbent beads communicate with said interior space to provide an adsorbing function for said interior space while said beads are retained in and by said compartment(s), the improvement comprising filling said compartment(s) with adsorbent beads wherein at least a portion of said adsorbent beads are polymer-bound adsorbent beads comprising adsorbent compounded with a polymer binder.

22. The insulating glass unit of claim 1 wherein the adsorbent is inorganic desiccant.

23. The insulating glass unit of claim 22 wherein the adsorbent comprises desiccant zeolite.

24. The method of claim 21 wherein the adsorbent is inorganic desiccant.

25. The method of claim 24 wherein the adsorbent comprises desiccant zeolite.

* * * * *